United States Patent

[11] 3,622,576

| | | |
|---|---|---|
| [72] | Inventor | Jacques Baetz<br>La Garenne-Colombes, France |
| [21] | Appl. No. | 726,749 |
| [22] | Filed | May 6, 1968 |
| [45] | Patented | Nov. 23, 1971 |
| [73] | Assignee | Seperic |
| [32] | Priority | May 19, 1967 |
| [33] | | Great Britain |
| [31] | | 23,462/67 |

[54] 2-TERTIARYAMINO OR PYRIDYL ALKYL-4,6 DIPHENYL-3 PYRIDAZONES
6 Claims, 2 Drawing Figs.

[52] U.S. Cl. .................................................. 260/247.1,
260/247.2 A, 260/250 A, 424/248
[51] Int. Cl. ........................................................ C07d 87/46

[50] Field of Search .......................................... 260/250,
247.2, 247.1

[56] References Cited
UNITED STATES PATENTS

| | | | |
|---|---|---|---|
| 2,783,232 | 2/1957 | Gutmann et al. ............. | 260/250 |
| 3,017,411 | 1/1962 | Engelbrecht et al. ......... | 260/247.2 |

Primary Examiner—Nicholas S. Rizzo
Assistant Examiner—Jose Tovar
Attorney—Young & Thompson ABSTRACT: The new diphenyl-pyridazones are 4,6-di-(phenyl or substituted phenyl)-pyridaz-3-ones substituted at 2-position by a dialkylaminoalkyl group or an alkyl group substituted with a heterocycle containing a nitrogen atom. They are useful as psychotropic and analgesic drugs.

2-TERTIARYAMINO OR PYRIDYL ALKYL-4,6 DIPHENYL-3 PYRIDAZONES

Figure 1:
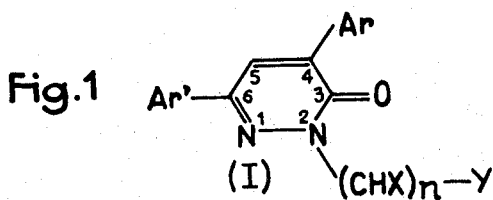

The present invention relates to a family of new chemical compounds having therapeutic properties. These compounds are those of general formula (I), illustrated in FIG. 1 of the accompanying drawing, wherein Ar and Ar', which may be the same or different, are phenyl groups, or phenyl groups mono- or poly-substituted with halogen atoms, alkyl, hydroxy, alkoxy, alkylamino or trifluoromethyl groups, X is hydrogen or lower alkyl, $n$ is an integer equal to 1 or more, the various X's, when $n$ is greater than 1, not being necessarily identical, and Y is a dialkylamino group or a heterocycle containing a nitrogen atom, alkyl-substituted or not, said heterocycle eventually comprising a second heteroatom and being bound to group $(CH\ X)_n$ by its nitrogen atom or one of its nuclear carbons, and their acid addition salts, particularly with pharmaceutically acceptable avids.

Thus, compounds (I) are 2-substituted 4,6-diphenylpyridaz-3-ones.

Compounds (I) have a psychotropic and analgesic activity.

The presence, at 4-position, of a substituted or unsubstituted benzene nucleus imparts to such compounds a particularly marked activity.

In the aforesaid definition of compounds (I), the alkyl groups and the alkyl moieties of the alkoxy, alkylamino and dialkylamino groups are advantageously lower alkyls, particularly of one to four carbon atoms.

Similarly, $n$ is preferably an integer of 1–3.

Finally, when Ar' is a substituted phenyl group, meta substitution is preferred.

Figure 2:
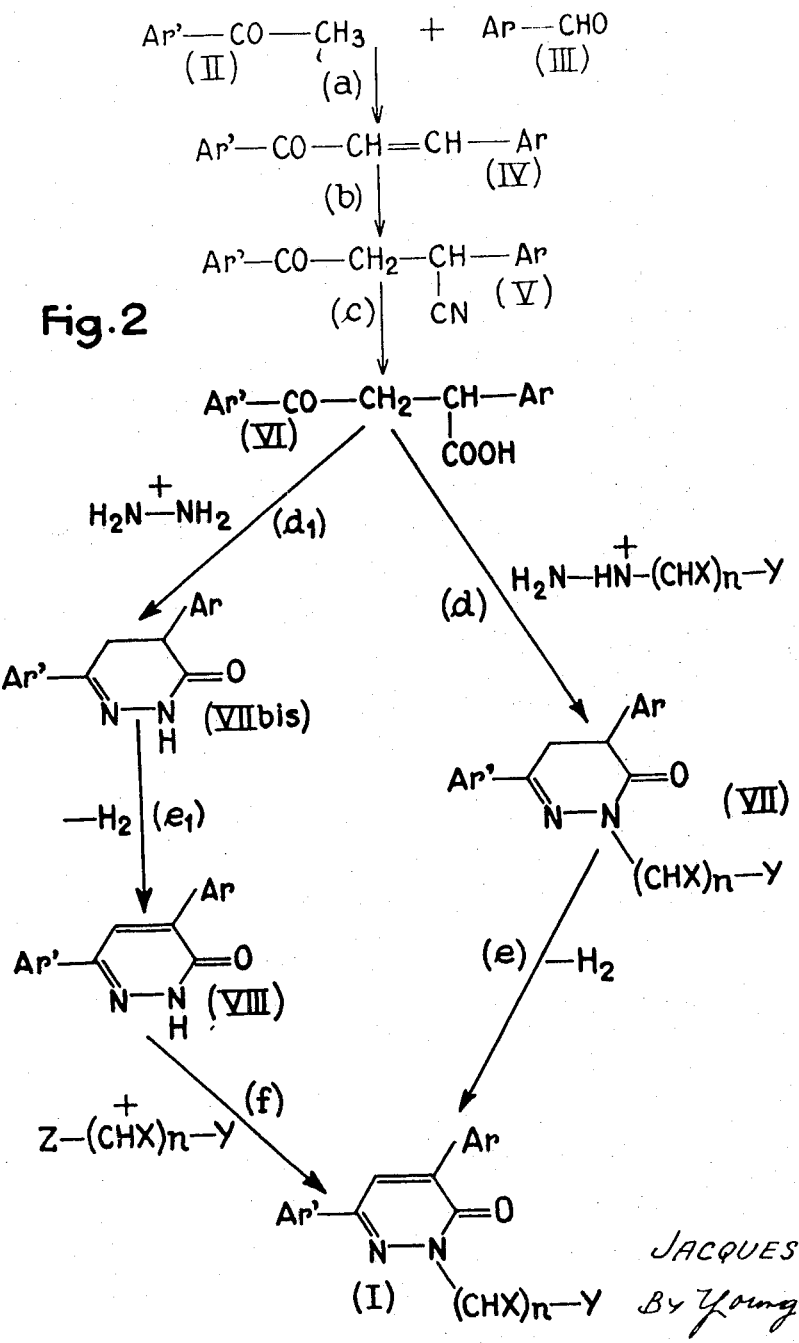

To prepare such compounds, there is used a process the main steps of which are illustrated in FIG. 2 of the accompanying drawing.

This process uses, as starting materials, $\alpha,\gamma$-diphenyl-$\gamma$-ketonic acids (VI). Compounds (VI) are generally known, the preparation thereof being described and illustrated in the drawing only for information purposes. For such preparation, the starting materials are acetophenones (II) which are condensed (stage $a$) with benzaldehydes (III) at room temperature, in the presence of sodium hydroxide or other alkaline base, in ethanol or some other suitable solvent. After washing and drying, the resulting benzalacetophenones (IV) are treated (stage $b$) with potassium cyanide in the presence of acetic acid. The resulting nitriles (V) are washed and dried, and are then hydrolyzed with refluxing sodium hydroxide during several hours (stage $c$), and acids (VI) are then precipitated with hydrochloric acid, and are then washed and dried.

Starting from the resulting $\alpha,\gamma$-diphenyl-$\gamma$-ketonic acids (VI), the process according to the invention comprises condensing such acids, or an ester of such acids, with hydrazines of general formula $H_2N-NH-R$, wherein R is hydrogen or a $-(CHX)_n-Y$ group wherein X, Y and $n$ have the same meaning as in formula (I) above, thus obtaining 4,6-diphenyl-pyridazinones of formula:

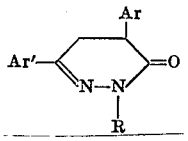

dehydrogenating such pyridazinones to the corresponding pyridazones and, when R is hydrogen, introducing group $(CHX)_n-Y$ by condensation of the 2-unsubstituted diphenyl-pyridazone with a halide of formula $Z-(CHX)_n-V$, wherein Z is halogen.

The various stages of the process will now be examined in greater detail with reference to FIG. 2. In the FIG., for purposes of clarity, the case where, in hydrazines $H_2N-NH-R$, R is hydrogen is distinguished from the case where R is $-(CHX)_n-Y$.

Thus, the condensation of $\alpha,\gamma$-diphenyl-$\gamma$-ketonic acids (VI) with substituted hydrazines constitutes stage $d$, whereas condensation with the unsubstituted hydrazine constitutes stage $d_1$.

Condensation with hydrazines according to stages $d$ or $d_1$ is carried out in a suitable solvent, such as butanol, which, owing to the formation of an azeotrope, makes it possible to remove the two molecules of water resulting from the condensation. It should be noted that such condensation may be carried out just as readily with the $\alpha,\gamma$-diphenyl-$\gamma$-ketonic acids (VI) in the form of simple esters (such as methyl, ethyl, etc.)

Thus, depending on whether route $d$ or $d_1$ is used, there are produced pyridazinones (VII) or (VII bis).

Such pyridazinones (VII) or (VII bis) are then dehydrogenated at 4,5-position with bromine in acetic acid, thus giving 2-substituted 4,6-diphenyl-pyridaz-3-ones (I), according to route $e$, or 2-unsubstituted 4,6-diphenyl-pyridaz-3-ones (VIII) according to route $e_1$. The 2-unsubstituted pyridazones (VIII) are condensed (stage $f$) with halides of general formula $Z-(CHX)_n-Y$, wherein Y and Z have the same meaning as above. The condensation may be carried out in the presence of an alkali metal alkoxide such as sodium methoxide or ethoxide, within the corresponding alcohol. As a modification, this condensation may be effected within water, in the presence of an alkaline base, such as sodium hydroxide. In addition, it should be noted that the order of stages $e_1$ and $f$ may be reversed. This amounts to effecting the preparation according to stages $d$ and $e$, stage $d$ being merely divided into two successive condensations, the first with hydrazine $NH_2-NH_2$, and the second with halide $Z-(CHX)_n-Y$.

Pyridazones (I), of basic character, may be converted into suitable salts of inorganic acids, such as the hydrochlorides, or salts of organic acids, such as the methane-sulfonates, to facilitate their use.

Conjugation with an acid may be obtained at an earlier stage, for example at the stage where dehydrogenation of the pyridazinones is effected, in which case, the desired salt will be obtained directly (see examples 3 and 4, below).

In addition to compounds (I), compounds (VII), (VII bis) and (VIII) are new compounds.

The examples below are given to illustrate the invention. There are described only the stages starting from compounds (VI).

EXAMPLE 1

2-($\beta$-morpholino-ethyl)-4-(o-chlorophenyl)-6-phenyl-pyridaz-3-one (Code Number; 450)
(Compound I, Ar = o-chlorophenyl, Ar' = phenyl, $(CHX)_n = CH_2-CH_2$, Y = morpholino)

Stage $d$

In a 250 ml. flask, introduce 29.4 g. of (o-chlorophenyl)-$\beta$-benzoyl-propionic acid (VI) and 60 ml. of butanol. Warm to dissolve and add a solution of 15.5 g. of morpholino-ethyl-hydrazine in 31 ml. of butanol. Heat to reflux temperature, and distill slowly the binary butanol/water azeotrope. Terminate the operation when pure butanol is collected. Bring to dryness, under vacuum of the water-pump. The resulting yellow oil is dissolved in 500 ml. of chloroform, treated with gaseous hydrochloric acid, and is then filtered and washed with ethanol-water. The chloroform phase is dried over dry sodium sulfate and the solution is brought to dryness, in vacuo, to give friable froths used as such in the following stage.

Stage

In a 1 liter flask, dissolve 44 g. of 2-($\beta$-morpholino-ethyl)-4-(o-chlorophenyl)-6-phenylpyridazinone hydrochloride (compound (VII) formed by the friable froths from stage $d$ above) in 660 ml. of acetic acid. The resulting light yellow solution is heated at 70° C. and a solution of 16.3 g. of bromine in 81.5 ml. of acetic acid is cautiously introduced therein. Heat to refluxing during 2 hours. The resulting hydrobromic acid is evolved and the solution becomes dark red. After drying, the resulting brown oil is dissolved in 750 ml. of chloroform to which are added, with vigorous stirring, 280 ml. of 2N sodium hydroxide: the oil dissolves in the chloroform when the pH becomes alkaline. After washing and drying, add 200 ml. of ethanol, and then remove the remaining ethanol by distillation. Crystallization is obtained by scratching, and the material is left overnight in the ice-chest. The crystals are suction filtered, washed with ice-cold ethanol, and are then dried in vacuo overnight in the presence of potassium hydroxide.

After recrystallization from methanol, 28.2 g. of pink colored 2-($\beta$-morpholino-ethyl) -4-(o-chlorophenyl)-6-phenyl-piridaz-3-one are obtained.

Melting point: 127° C.

EXAMPLE 2

2-($\beta$-morpholino-ethyl)-4-(m-chlorophenyl)-6-phenyl-pyridaz-3-one (Code Number: 390).
(Compound I, Ar = m-chlorophenyl, Ar' = phenyl, $(CHX)_n = CH_2-CH_2-$, Y = morpholino).

Stage d 26.9 g. of $\alpha$-m-chlorophenyl-$\gamma$-phenyl-$\gamma$-ketobutyric acid (VI) are dissolved in 60 ml. of hot butanol. 14.5 g. of $\beta$-morpholinoethyl-hydrazine dissolved in 40 ml. of butanol are slowly added thereto. The water formed is removed by distillation of the butanol/water azeotrope. The remaining butanol solution is dried in vacuo. The resulting yellow oil is dissolved in 415 ml. of chloroform and treated with gaseous hydrochloric acid. The material is washed with an ethanol-water mixture and is then dried in vacuo. 40 g. of 2-($\beta$-morpholinoethyl)-4-(m-chlorophenyl)-6-phenyl-pyridazin-3-one hydrochloride (compound VII, Ar = m-chlorophenyl, Ar' = phenyl, $(CHX)_n = -CH_2-CH_2-$, Y = morpholino) are thus obtained.

Stage e

The pyridazinone (39 g.) obtained in stage d above is dissolved in 530 ml. of pure acetic acid and, after heating at 60° C., a solution of 15.5 g. of bromine in 80 ml. of acetic acid is slowly added thereto, with stirring. The mixture is refluxed during 2.5 hours. The red colored solution is dried in vacuo. The resulting reddish oil is taken up into 850 ml. of chloroform, and 2N sodium hydroxide is added thereto to alkaline pH. The material is decanted, washed with water, dried over sodium sulfate, washed with chloroform and is then brought to dryness in vacuo. The resulting oil, dissolved in 140 ml. of ethanol, crystallizes on scratching. After suction filtering and washing with cold ethanol, there are obtained 30 g. of crude product which is recrystallized by treatment with 250 ml. of refluxing ethanol, and is filtered hot: the product crystallizes on cooling. After resting overnight in the ice-chest, the product is suction filtered, washed with cold ethanol, and is then dried in vacuo in the presence of potassium hydroxide. 28 g. of 2-($\beta$-morpholino-ethyl)-4-(m-chlorophenyl)-6-phenyl-pyridaz-3-one are thus obtained.

Melting point = 118° C.

To prepare the hydrochloride, 16.9 g. of this base are dissolved in 100 ml. of hot acetone. Gaseous hydrochloric acid is bubbled through it. The hydrochloride crystallizes on cooling. This is washed with 1×20 ml. of acetone and then with 2×15 ml. of ether. After drying in vacuo at room temperature during 3 hours, 18.3 g. of 2($\beta$-morpholino-ethyl)-4-(m-chlorophenyl)-6-phenyl-pyridaz-3-one, m.p. 222°–223° C., are obtained.

EXAMPLE 3

2-($\gamma$-picolyl)-4-(m-chlorophenyl)-6phenyl-pyridaz-3-one (Code Number: 460)
(Compound I, Ar = m-chlorophenyl, Ar' = phenyl, $(CHX)_n = CH_2$, Y = 4-pyridyl).

This example illustrates the embodiment using stages $d_1$, $e_1$ and $f$.

Stage $d_1$

In a 500 ml. flask, 29 g. of $\alpha$-(m-chlorophenyl)-$\gamma$-phenyl-$\gamma$-ketobutyric acid (VI) are dissolved in 140 ml. of butanol. 5.5 g. of hydrazine hydrate are gradually added. The water formed is removed by distillation of 30 ml. of the butanol/water azeotrope. The remaining butanol solution is filtered hot. Crystallization is instantaneous. After 1 hour, the material is suction filtered, washed with butanol and ethanol, and is then dried in the presence of potassium hydroxide. There are thus obtained 23.9 g. of 4-(m-chlorophenyl)-6-phenyl-pyridazin-3-one (Compound (VII bis), Ar = m-chlorophenyl, Ar' = phenyl).

Stage $e_1$ 14.5 g. of the pyridazinone obtained in stage $d_1$ above are dissolved in 400 ml. of acetic acid, at 50°–55° C., and 3.9 ml. of bromine diluted in 35 ml. of acetic acid are added thereto over 45 minutes. After heating at 80° C. during 1 hour, the hydrobromic fumes are removed. The cooled solution is evaporated to dryness. The residue is taken up into 100 ml. of methanol and crystals appear. The material is suction filtered and washed with methanol. After drying, there are obtained 15.2 g. of brominated material which is refluxed during 1 hour in 100 ml. of acetic acid with 3.7 g. of dry sodium acetate. Crystallization occurs on cooling. There are thus obtained 11.8 g. of 4-(m-chlorophenyl)-4-phenyl-pyridaz-3-one (Compound VIII, Ar = m-chlorophenyl, Ar' = phenyl).

Stage f

Nine g. of the pyridazone obtained in stage $e_1$ above are added to 100 ml. of alcohol with 24 ml. of sodium ethoxide solution formed by adding 3 g. of sodium to a sufficient amount of ethanol to give 100 ml. The sodium derivative dissolves in the cold: this is solution A. On the other hand, 5.25 g. of $\omega$-4-chloropicoline hydrochloride are converted into the base by addition of 24.5 ml. of the same sodium ethoxide solution: this is solution B. Solutions A and B are combined and are refluxed during 1 hour and 45 minutes. The material is then suction filtered and concentrated to dryness. This is taken up into 50 ml. of methanol and methane-sulfonic acid is added to acidic pH. The crystalline methane-sulfonate is then precipitated with the just sufficient amount of isopropyl ether. This is then suction filtered and dried in a desiccator. There are thus obtained 10 g. of 2-($\gamma$-picolyl)-4-(m-chlorophenyl)-6-phenyl-pyridaz-3-one methane-sulfonate.

The melting point of said methane sulfonate is 202° C.

EXAMPLE 4

2-($\beta$-morpholino-ethyl)-4,6-di-(p-methoxphenyl)-pyridaz-3-one
(Compound I, Ar = Ar' = p-methoxyphenyl, $(CHX)_n = CH_2-CH_2-$, Y = morpholino).

Stage d 15.7 g. of $\alpha$, $\gamma$-di-(p-methoxyphenyl)-$\gamma$-ketobutyric acid (VI) are dissolved in 70 ml. of hot butanol. There are slowly added thereto 7.25 g. of $\beta$-morpholino-ethyl-hydrazine dissolved in 25 ml. of butanol. The water formed is removed by distillation of the butanol/water azeotrope. The remaining butanol solution is dried in vacuo. The resulting yellow oil is dissolved in 210 ml. of chloroform and is then treated with hydrochloric gas. The material is washed with 33 ml. of water +50 ml. of ethanol, and is then dried over sodium sulfate. There are thus obtained 21.5 g. of 2-($\beta$-morpholino-ethyl)-4,6-di-(p-methoxy-phenyl)-pyridazin-3-one (Compound VII, Ar = Ar' = p-methoxyphenyl, $(CHX)_n = -CH_2-CH_2-$, Y = morpholino).

Stage e 9.2 g. of the pyridazinone obtained in stage d above are dissolved in 135 ml. of acetic acid, with stirring and while nitrogen is bubbled through. The solution is heated at 60°–65° C. A solution of 3.2 g. of bromine in 20 ml. of acetic acid is added over 45 minutes. The reaction mixture is heated at 80°–90° C. during 1 hour and 40 minutes and the hydrobromic fumes are removed as formed, by aspiration. The acidic solution is brought to dryness in vacuo, and the residue is dissolved in 200 ml. of chloroform. The material is washed with sodium hydroxide, then with water until neutral, and is then dried over sodium sulfate. It is then suction filtered, dried and taken up into 150 ml. of isopropanol through which hydrochloric gas is bubbled. After drying in vacuo, the material is again taken up into 120 ml. of hot isopropanol: crystallization occurs on cooling. After 2 hours in the ice-chest, suction filtering, washing with cold isopropanol and drying, there are obtained 6.5 g. of 2-(β-morpholino-ethyl)-4,6-di-(p-methoxy-phenyl)pyridaz-3-one hydrochloride.

Melting point = 218°–220° C.

The base may be obtained from this hydrochloride, and may be converted into another salt, such as the methane sulfonate.

I. Preparation of the base 11.45 g. of 2-(β-morpholino-ethyl)-4,6-di-(p-methoxyphenyl)-pyridaz-3-one hydrochloride are dissolved in 110 ml. of water, in the hot. To this material are added 50 ml. of chloroform, and 2.53 g. of potassium bicarbonate are then added.

The organic phase is decanted and is extracted with 2×50 ml. of chloroform. The organic extracts are combined and are then washed with 50 ml. of water, and are then dried over sodium sulfate. After suction filtering, the filtrate is brought to dryness in vacuo. The oily residue represents the base.

II. Preparation of the methane sulfonate

To the acetone solution of the base, obtained by adding 12 ml. of acetone to the oily residue, are added 2.42 g. of methane sulfonic acid. There are added 40 ml. of isopropyl ether; the salt crystallizes. This is allowed to rest overnight in the refrigerator. It is then suction filtered and washed with 3×25 ml. of isopropyl ether. The material is dried in an oven at 40° C., in vacuo, during 24 hours, to give: 12.2 g. of 2-(β-morpholino-ethyl)-4,6di-(p-methoxyphenol)-pyridaz-3-one.

Yield: 94.5 percent.

This methane sulfonate has a melting point of 165°–167° C.

EXAMPLE 5

2-(β-morpholino-ethyl)-4-phenyl-6-(m-methoxyphenyl)-pyridaz-3-one sulfamate (Code Number : 478).
(Compound I, Ar = phenyl, Ar' = m-methoxyphenyl, (CHX)$_n$=CH$_2$—CH$_2$—, Y = morpholino).

Operating as in example 2, but replacing, in stage d, compound VI with α-phenyl-γ-(m-methoxyphenyl)-γ-ketobutyric acid, there is obtained 2-(β-morpholino-ethyl)-4-(phenyl)-6-(m-methoxyphenyl)-pyridaz-3-one.

19.5 g. (0.05 mole) of this pyridazone are dissolved in the hot (60° C.) in 100 ml. of ethanol, and 4.85 g. of sulfamic acid (0.05 mole) are then added portionwise.

While waiting for dissolution to occur, prior to each introduction, the mixture is heated to boiling and is then allowed to cool; the sulfamate crystallizes.

The material is allowed to rest overnight in the refrigerator. It is then suction filtered, washed with 15 ml. of cold ethanol and with 15 ml. of cold acetone.

It is then dried during 4 hours in an oven at 40°C., in vacuo, in the presence of potassium hydroxide.

There are thus obtained, with a yield of 90 percent, 21.9 g. of sulfamate having a melting point of 145° C.
Analysis: Total nitrogen: 11.31 percent Theory: 11.46 percent
11.35 percent In the table below are summarized the physical-chemical properties of the compounds obtained according to the above examples and of other compounds according to the invention obtained in an analogous manner. This table sets forth also the LD 50 in mg./kg. of said compounds, determined in mice by the intraperitoneal route or per os, according to the indication "I.P." or "P.O." given in the table.

TABLE.—DIPHENYL-PYRIDAZONES OF FORMULA (I)

| Ar | —(CHX)$_n$— | Ar' | Y | Empirical formula | Melting point, °C. | Code No. | LD50 |
|---|---|---|---|---|---|---|---|
| C$_6$H$_5$— | —CH$_2$—CH$_2$— | C$_6$H$_5$— | Morpholino | C$_{22}$H$_{23}$N$_3$O$_2$ | Base: 141–142 | 374 | I.P. 425 mg./kg. |
| C$_6$H$_5$— | —CH$_2$—CH$_2$— | C$_6$H$_5$— | β-Pyridyl | C$_{22}$H$_{17}$N$_3$O | Base: 160 | 382 | P.O. 3,000 mg./kg. |
| C$_6$H$_5$— | —CH$_2$—CH$_2$— | (p)-Cl—C$_6$H$_4$— | Morpholino | C$_{22}$H$_{22}$ClN$_3$O$_2$ | Base: 128 | 388 | P.O. 600 mg./kg. |
| (m)-Cl—C$_6$H$_4$— | —CH$_2$—CH$_2$— | C$_6$H$_5$— | do | C$_{22}$H$_{22}$ClN$_3$O$_2$ | Base: 118; hydrochloride: 222–223; methane-sulfonate: 160. | 390 | I.P. 450 mg. |
| (p)-CH$_3$O—C$_6$H$_4$— | —CH$_2$—CH$_2$— | C$_6$H$_5$— | do | C$_{23}$H$_{25}$N$_3$O$_3$ | Hydrochloride: 218–220 base: 90–100 | 391 | I.P. 430 mg./kg. |
| (p)-Cl—C$_6$H$_4$— | —CH$_2$—CH$_2$— | (p)-CH$_3$O—C$_6$H$_4$— | do | C$_{23}$H$_{24}$ClN$_3$O$_3$ | Base: 114–115 | 439 | I.P. 520 mg./kg.; P.O. 2,400 mg./kg. |
| (p)-Cl—C$_6$H$_4$— | —CH$_2$—CH$_2$— | (p)-Cl—C$_6$H$_4$— | do | C$_{22}$H$_{21}$Cl$_2$N$_3$O$_2$ | Base: 138 | 440 | P.O. 4,200 mg./kg. |
| (p)-CH$_3$O—C$_6$H$_4$— | —CH$_2$—CH$_2$— | (p)-Cl—C$_6$H$_4$— | do | C$_{23}$H$_{24}$ClN$_3$O$_3$ | Base: 124–126; hydrochloride: 200–203 | 445 | I.P. 355 mg./kg. |
| C$_6$H$_5$— | —CH$_2$—CH$_2$— | C$_6$H$_5$— | do | C$_{22}$H$_{23}$N$_3$O$_2$ | Base: 86, hydrochloride: 248 | 446 | I.P. 192 mg./kg. |
| (p)-Cl—C$_6$H$_4$— | —CH$_2$—CH$_2$— | C$_6$H$_5$— | do | C$_{22}$H$_{22}$ClN$_3$O$_2$ | Base: 114–115 | 447 | I.P. 170 mg./kg. |
| (o)-Cl—C$_6$H$_4$— | —CH$_2$—CH$_2$— | C$_6$H$_5$— | do | C$_{22}$H$_{22}$ClN$_3$O$_2$ | Base: 141 | 448 | P.O. 2,400 mg./kg. |
| (m)-Cl—C$_6$H$_4$— | —CH$_2$—CH$_2$— | C$_6$H$_5$— | do | C$_{22}$H$_{22}$ClN$_3$O$_2$ | Base: 119–120 | 450 | I.P. 600 mg./kg.; P.O. 3,500 mg./kg. |
| (m)-Cl—C$_6$H$_4$— | —CH$_2$—CH$_2$— | (p)-Cl—C$_6$H$_4$— | do | C$_{22}$H$_{21}$Cl$_2$N$_3$O$_2$ | Base: 127, hydrochloride: 140–143 | 458 | I.P. 425 mg./kg.; P.O. 3,250 mg./kg. |
| (m)-Cl—C$_6$H$_4$— | —CH$_2$—CH$_2$— | C$_6$H$_5$— | do | C$_{22}$H$_{22}$ClN$_3$O$_2$ | Base: 161–162 | 459 | I.P. 105 mg./kg., P.O. 850 mg./kg. |
| (m)-Cl—C$_6$H$_4$— | —CH$_2$—CH$_2$— | C$_6$H$_5$— | γ-Pyridyl | C$_{24}$H$_{21}$N$_3$O$_3$ | Base: 111–113, methane-sulfonate: 202 | 460 | |
| | —CH$_2$—CH$_2$— | | do | C$_{22}$H$_{16}$ClN$_3$O | | | |
| (p) $\underset{CH_3}{\overset{CH_3}{N}}$—C$_6$H$_4$— | —CH$_2$—CH$_2$— | C$_6$H$_5$— | Morpholino | C$_{24}$H$_{28}$N$_4$O$_2$ | Base: 146 | 464 | I.P. 410 mg./kg.; P.O. 565 mg./kg. |
| (m)-Cl—C$_6$H$_4$— | —CH$_2$—CH$_2$— | (p)-CH$_3$O—C$_6$H$_4$— | do | C$_{23}$H$_{24}$ClN$_3$O$_3$ | Base: 101–102 | 467 | I.P. 500 mg./kg.; P.O. >3,000 mg./kg. |
| C$_6$H$_5$— | —CH$_2$—CH$_2$— | (p)-CH$_3$O—C$_6$H$_4$— | do | C$_{23}$H$_{25}$N$_3$O$_3$ | Hydrochloride: 195–196; base: 99 | 474 | I.P. 512 mg./kg.; P.O. 1,650 mg./kg. |
| (m)-CF$_3$—C$_6$H$_4$— | —CH$_2$—CH$_2$— | (m)-CF$_3$—C$_6$H$_4$— | do | C$_{24}$H$_{22}$N$_3$O$_2$F$_3$ | Hydrochloride: 115; base: 100 | 476 | I.P. 575 mg./kg.; P.O. 2,500 mg./kg. |
| (m)-CH$_3$O—C$_6$H$_4$— | —CH$_2$—CH$_2$— | C$_6$H$_5$— | do | C$_{23}$H$_{25}$N$_3$O$_3$ | Base: 118; sulfamate: 145 | 478 | I.P. 540 mg./kg.; P.O. 2,500 mg./kg. |
| (m)-CF$_3$—C$_6$H$_4$— | —CH$_2$—CH$_2$— | C$_6$H$_5$— | do | C$_{23}$H$_{22}$N$_3$O$_2$F$_3$ | Base: 109–110; hydrochloride: 229–231 | 479 | I.P. 500 mg./kg.; P.O. >3,000 mg./kg. |
| (m)-F—C$_6$H$_4$— | —CH$_2$—CH$_2$— | C$_6$H$_5$— | do | C$_{22}$H$_{22}$N$_3$O$_2$F | Base: 109–110; hydrochloride: 191–193; base: 135–136 | 485 | I.P. 680 mg./kg.; P.O. >3,000 mg./kg. |
| (m)-CH$_3$O—C$_6$H$_4$— | —CH$_2$—CH$_2$— | C$_6$H$_5$— | do | C$_{23}$H$_{25}$N$_3$O$_3$ | Hydrochloride: 193 | 488 | I.P. 440 mg./kg.; P.O. >3,000 mg./kg. |
| (m)-Br—C$_6$H$_4$— | —CH$_2$—CH$_2$— | C$_6$H$_5$— | do | C$_{22}$H$_{22}$O$_2$N$_3$Br | Hydrochloride: 200; base: 114–115 | 494 | I.P. 430 mg./kg.; P.O. >3,000 mg./kg. |
| (m)-C$_2$H$_5$O—C$_6$H$_4$— | —CH$_2$—CH$_2$— | C$_6$H$_5$— | do | C$_{24}$H$_{27}$O$_3$N$_3$ | Base: 121 | 498 | I.P. 605 mg./kg.; P.O. >3,000 mg./kg. |

TABLE.—DIPHENYL-PYRIDAZONES OF FORMULA (I)—Continued

| Ar | Ar' | —(CHX)ₙ— | Y | Empirical formula | Melting point, °C. | Code No. | LD50 |
|---|---|---|---|---|---|---|---|
| C₆H₅— | (o)-Cl—C₆H₄— | —CH₂—CH₂— | ...do... | C₂₂H₂₂N₃O₂Cl | Hydrochloride: 200–202; base: 118 | 500 | I.P. 530 mg./kg.; P.O. >3,000 mg./kg. |
| C₆H₅— | (p)-CH₃O—C₆H₄— | —CH₂—CH₂— | ...do... | C₂₃H₂₅O₃N₃ | Hydrochloride: 210–212 | 505 | I.P. 420 mg./kg.; P.O. 1,600 mg./kg. |
| C₆H₅— | (m)-OH—C₆H₄— | —CH₂—CH₂— | ...do... | C₂₂H₂₃O₃N₃ | Base: 217 | 510 | I.P. 370 mg./kg.; P.O. 1,600 mg./kg. |
| C₆H₅— | (m)-C₆H₅O—C₆H₄— | —CH₂—CH₂— | ...do... | C₂₈H₂₇O₃N₃ | Base: 78 | 512 | |
| C₆H₅— | (m)-Cl—C₆H₄— | —CH₂—CH—CH₂— | ...do... | C₂₃H₂₄N₃O₂Cl | Hydrochloride: 238; base: 100–102 | 496 | I.P. 455 mg./kg.; P.O. 2,000 mg./kg. |
| C₆H₅— | (m)-Cl—C₆H₄— | —CH₂—CH₂— | Pyrrolidino | C₂₂H₂₃N₃ClO | Base: 80–81; hydrochloride: 163–164 | 499 | I.P. 120 mg./kg.; P.O. 1,300 mg./kg. |
| C₆H₅— | (m)-Cl—C₆H₄— | —CH₂—CH₂— | Piperidino | C₂₃H₂₄N₃ClO | Base: 96–97; hydrochloride: 190–195 | 501 | I.P. 135 mg./kg.; P.O. 3,000 mg./kg. |
| C₆H₅— | (m)-Cl—C₆H₄— | —CH₂—CH₂— | Diethylamino | C₂₂H₂₇O₂N₃ | Base: 63–64; hydrochloride: 162 | 503 | I.P. 115 mg./kg. |
| C₆H₅— | (m)-Cl—C₆H₄— | —CH₂—CH₂— | Diisopropylamino | C₂₄H₂₈N₃ClO | Hydrochloride: 228–229 | 506 | P.O. 2,200 mg./kg. |
| C₆H₅— | (m)-CH₃O—C₆H₄— | —CH₂—CH₂— | Dimethylamino | C₂₁H₂₈N₃O₂ | Base: 105; hydrochloride: 154 | 508 | I.P. 55 mg./kg.; P.O. 230 mg./kg. |
| C₆H₅— | (m)-CH₃O—C₆H₄— | —CH₂—CH₂— | 4-methylpiperazino | C₂₄H₃₀O₂N₄ | Base: 108–109; dihydrochloride: 218 | 511 | |
| C₆H₅— | (m)-Cl—C₆H₄— | —CH₂—CH₂—CH₂— | Piperidino | C₂₄H₂₈N₃O—Cl | Hydrochloride: 218; base: 73–75 | 514 | I.P. 95 mg./kg.; P.O. 1,000 mg./kg. |
| C₆H₅— | (m)-CF₃C₆H₄— | —CH₂—CH₂— | ...do... | C₂₄H₂₄O—F₃ | Hydrochloride: 226; base: 70 | 515 | P.O. 2,000 mg./kg. |
| C₆H₅— | (m)-CF₃C₆H₄— | —CH₂—CH₂— | Pyrrolidino | C₂₃H₂₂N₃—O—F₃ | Hydrochloride: 180–181; base: 85–87 | 516 | P.O. 1,400 mg./kg. |
| C₆H₅— | (m)-CH₃—O—C₆H₄— | —CH₂—CH₂— | Piperidino | C₂₄H₂₇PO₂—N₃ | Hydrochloride: 172–175; base: 78–80 | 518 | I.P. 130 mg./kg. |

As indicated previously, compounds (I) have a pyschotropic and analgesic activity that was demonstrated by means of the main pharmacological tests described below:

1°—Measure of the inhibition of the number of twisting movements produced in mice on intraperitoneal injection of 0.25 ml. per mouse of a phenylbenzoquinone solution containing 25 mg. of phenylbenzoquinone per 100 ml.

The test compounds are administered to the animals 10 minutes prior to the phenylbenzoquinone injection and the twisting movements are counted during 1 hour for each animal.

Generally, injection of phenylbenzoquinone alone causes fifty twisting movements per hour; were considered as being particularly active those compounds that inhibited such twisting movements by more than 70 percent, at a dosage equivalent to one-fifth of the LD 50: (the compounds are listed under their Code No.):

| | |
|---|---|
| 390 | 446 |
| 391 | 450 |
| 439 | 499 |
| 445 | 515 |

2°—Measure of the reaction time of mice to immersion of the tail of the animals in water heated to a temperature of 58° C.

When no product has been administered to the animal, the animal moves its tail within 1½ seconds.

The test compounds are administered to the animal 15 minutes prior to the first immersion: immersion of the tail is effected every 30 minutes during 2.5 hours.

Were considered as particularly active those compounds that extended by 3–4 seconds the reaction time of the animal, at a dosage equivalent to one-fifth the LD 50:

| | |
|---|---|
| 390 | 450 |
| 445 | 458 |
| 446 | 479 |
| 448 | 501 |

3°—Measure of the reaction time of mice placed over a plate maintained at a constant temperature of 56° C.; generally, the mice manifest pain to heat by paw-licking and agitation, after 10 to 20 seconds.

Were considered particularly active those compounds that extended by 10 to 15 seconds this reaction time:

| | |
|---|---|
| 338 | 459 |
| 390 | 499 |
| 391 | 506 |
| 450 | |

4°—Study of the behavior of mice and rats under the influence of a dosage equivalent to one-fifth of the LD 50 of the test compounds. This behavior being evaluated with respect to systemic sedation with decubitus, sleep, catatonic or cataleptic attitudes.

Were found particularly active the products listed under Code Numbers:

| | |
|---|---|
| 391 | 499 |
| 445 | 501 |
| 446 | 515 |
| 494 | 516 |

5°—Study of the activity of these products with respect to convulsions and death of the animals, induced with pentamethylenetetrazol, picrotoxine and strychnine.

Marked protection against pentamethylenetetrazol-induced effects: 391–439–446–450–478–479–499–501–515–516.

Marked protection against pictrotoxine- and strychnine-induced effects: 391–499–516.

Partial protection against picrotoxine- and strychnine-induced effects: 388–390–445–446–450–501–516.

6°—Study of the activity of the products in fighting mice: male mice isolated during 4 weeks present a condition of aggressivity which may even lead to a fight when each is again placed in the presence either of another male mouse which has been isolated, or of another male mouse maintained in normal conditions.

Were considered as particularly active those compounds that inhibited completely this aggressivity during 2 hours, at a dosage representing one-fortieth of LD 50: 445–499–501–515–516.

These sedative and analgesic properties are also found to occur in Humans and are thus applicable in human clinics, compounds (I) being administrable by the oral, parenteral or rectal route, at a daily dosage regimen of 100 mc. to 2 g.; the injectable route will be more particularly reserved for the water-soluble compounds, although it is possible to inject water-insoluble compounds by using another solvent.

For such administrations, the compounds are formulated as therapeutic compositions with the vehicles or excipients suitable for these various routes of administration. The compositions formulated in unit dosage form such as tablets, suppositories, ampoules, contain preferably from 100 to 400 mg. of compound (I).

Examples of suitable formulations are given below purely for illustrative purposes:

A. Formulation for ampoules:
    Compound n° 391                              100 mg.
    Sterile pyrogen-free water, q.s. to make     5 ml.
B. Formulation for one tablet:
    Compound n° 390                              200 mg.
    Lactose )
    Starch  )q.s. for one tablet finished at     400 mg.
    Talc   )
C. Formulation for one suppository:
    Compound n° 445                              200 mg.
    Semisynthetic glycerine, q.s. for
    one suppository weighing 2.5 g.

Having now described my invention what I claim as new and desire to secure by letters patent is:

1. A compound selected from the group consisting of compounds of the formula:

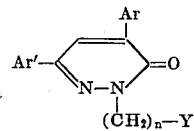

wherein:
Ar and Ar' are each selected from the group consisting of phenyl and mono-substituted phenyl selected from the group consisting of halophenyl, alkylphenyl having one–four carbon atoms in the alkyl group, hydroxyphenyl, alkoxyphenyl having one–four carbon atoms in the alkoxy group, alkylaminophenyl having one–four carbon atoms in the alkyl group and trifluoromethylphenyl, Y is selected from the group consisting of di-lower alkylamino, morpholino, pyridyl, pyrrolidino, piperidino and N-alkyl-piperazino having one–four carbon atoms in the alkyl group, $n$ is an integer from 1 to 3 but $n$ is 1 when Y is pyridyl, and the acid addition salts thereof.

2. 2-($\beta$-morpholino-ethyl)-4-phenyl-6-(m-chlorophenyl)-pyridaz-3-one or its salts.

3. 2-($\beta$-pyrrolidino-ethyl)-4-phenyl-6-(m-chlorophenyl)-pyridaz-3-one or its salts.

4. 2-($\beta$-piperidino-ethyl)-4-phenyl-6-(m-chlorophenyl)-pyridaz-3-one or its salts.

5. 2-($\beta$-piperidino-ethyl)-4-phenyl-6-(m-trifluoromethylphenyl)-pyridaz-3-one or its salts.

6. 2-($\beta$-pyrrolidino-ethyl)-4-phenyl-6-(m-trifluoromethylphenyl)-pyridaz-3-one or its salts.

* * * * *